Sept. 7, 1965   C. J. BECKER   3,204,798
SUPPORTING FRAME FOR CARGO TIE-DOWN NETS
Filed July 19, 1962   5 Sheets-Sheet 1

INVENTOR.
CARL J. BECKER
BY
MAHONEY, MILLER & RAMBO
BY W. A. Rambo
ATTORNEYS.

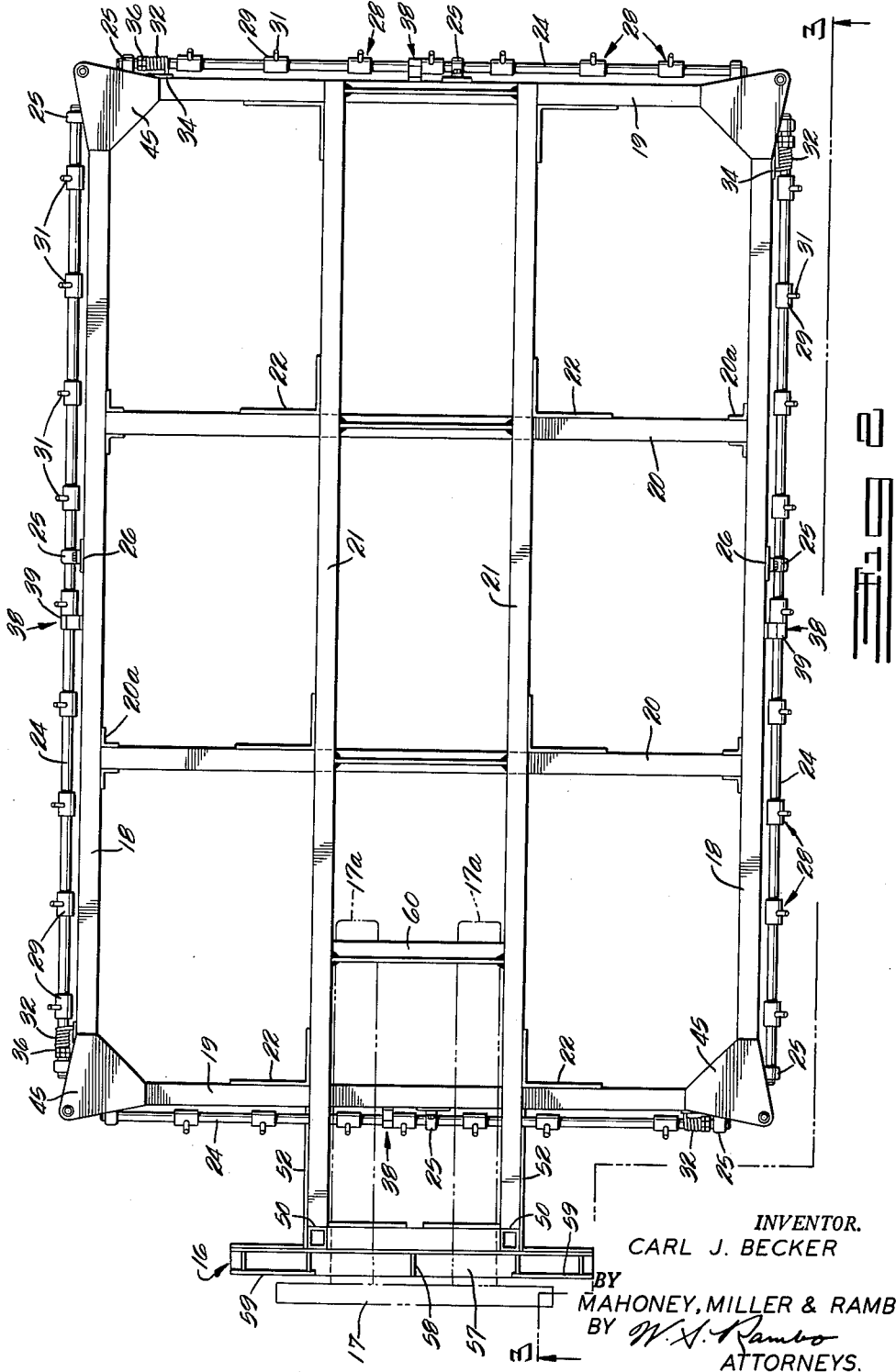

Sept. 7, 1965      C. J. BECKER      3,204,798
SUPPORTING FRAME FOR CARGO TIE-DOWN NETS
Filed July 19, 1962      5 Sheets-Sheet 3
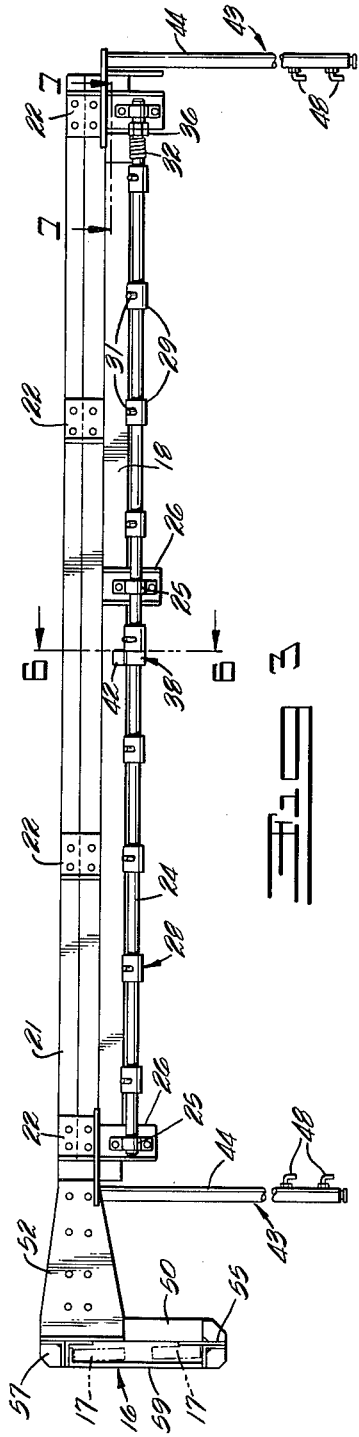
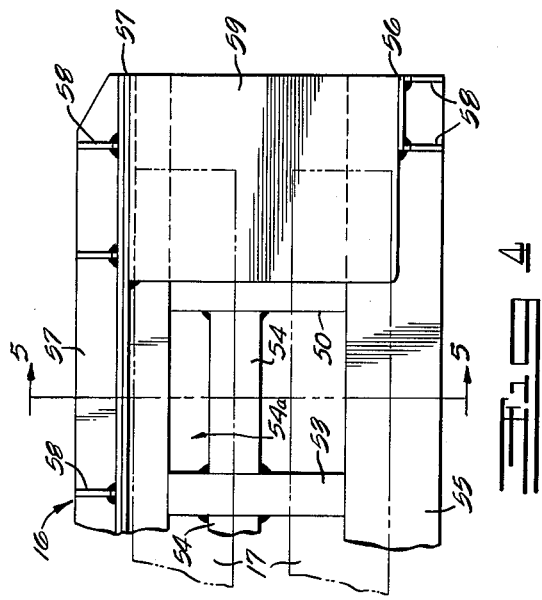
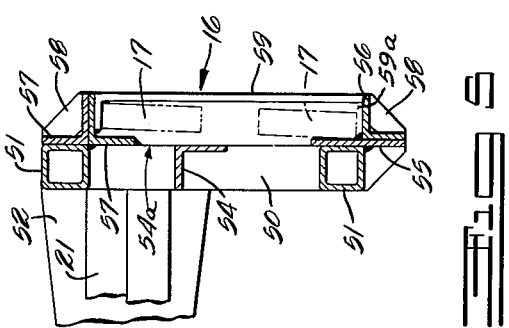
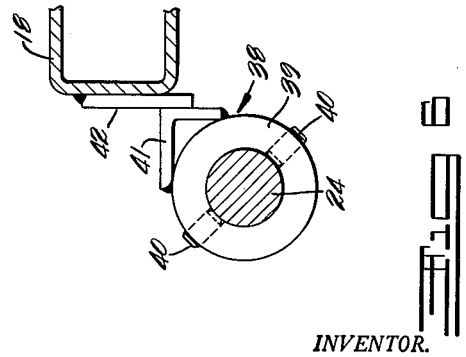
INVENTOR.
CARL J. BECKER
BY MAHONEY, MILLER & RAMBO
BY
ATTORNEYS.

Sept. 7, 1965
C. J. BECKER
3,204,798
SUPPORTING FRAME FOR CARGO TIE-DOWN NETS
Filed July 19, 1962
5 Sheets-Sheet 4
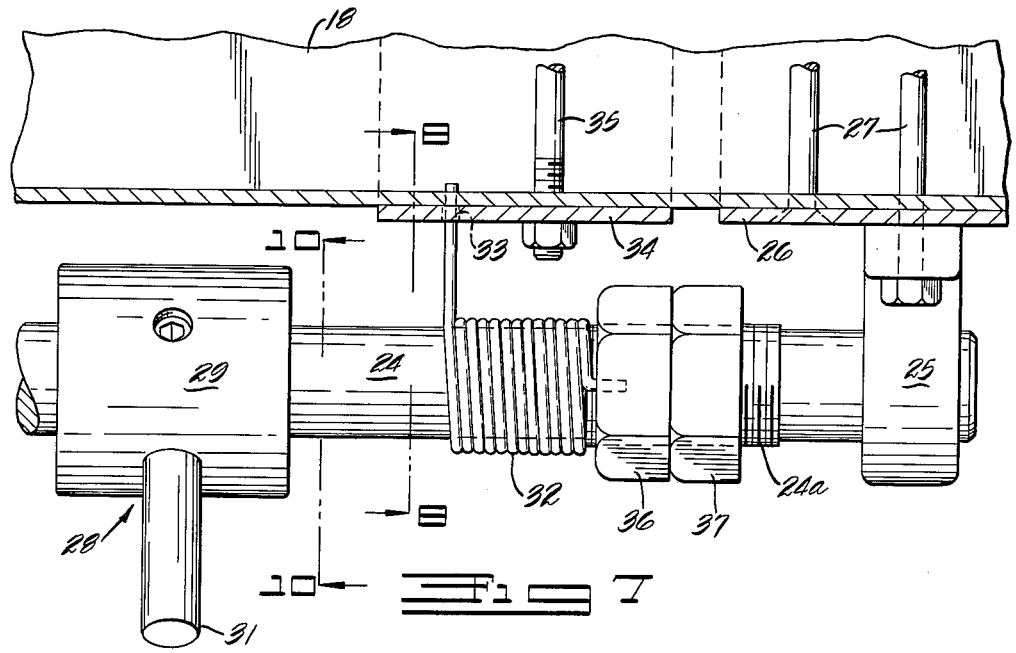
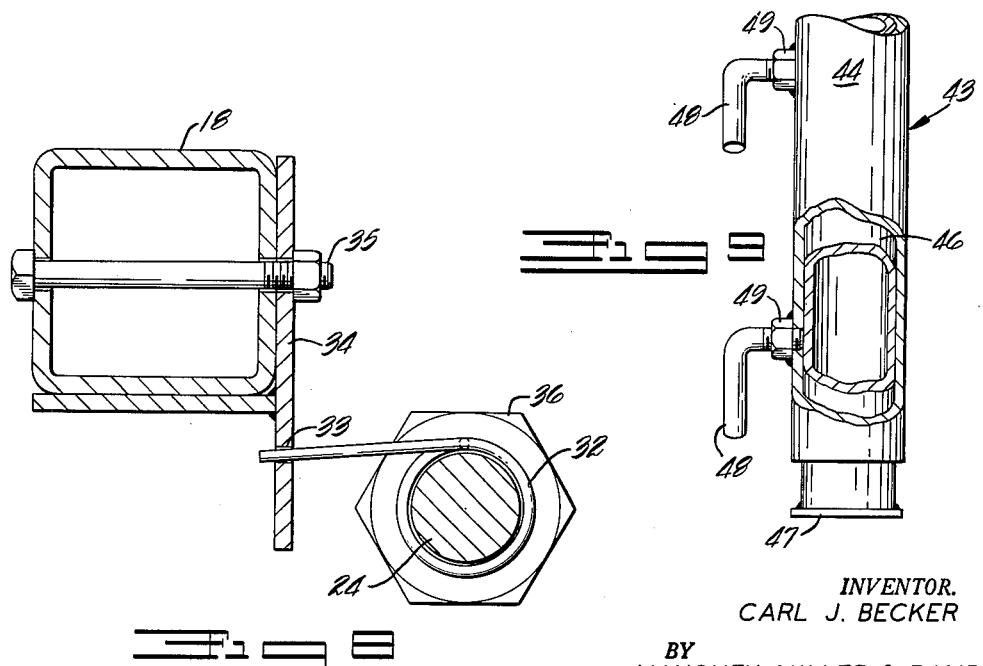
INVENTOR.
CARL J. BECKER
BY
MAHONEY, MILLER & RAMBO
BY
ATTORNEYS.

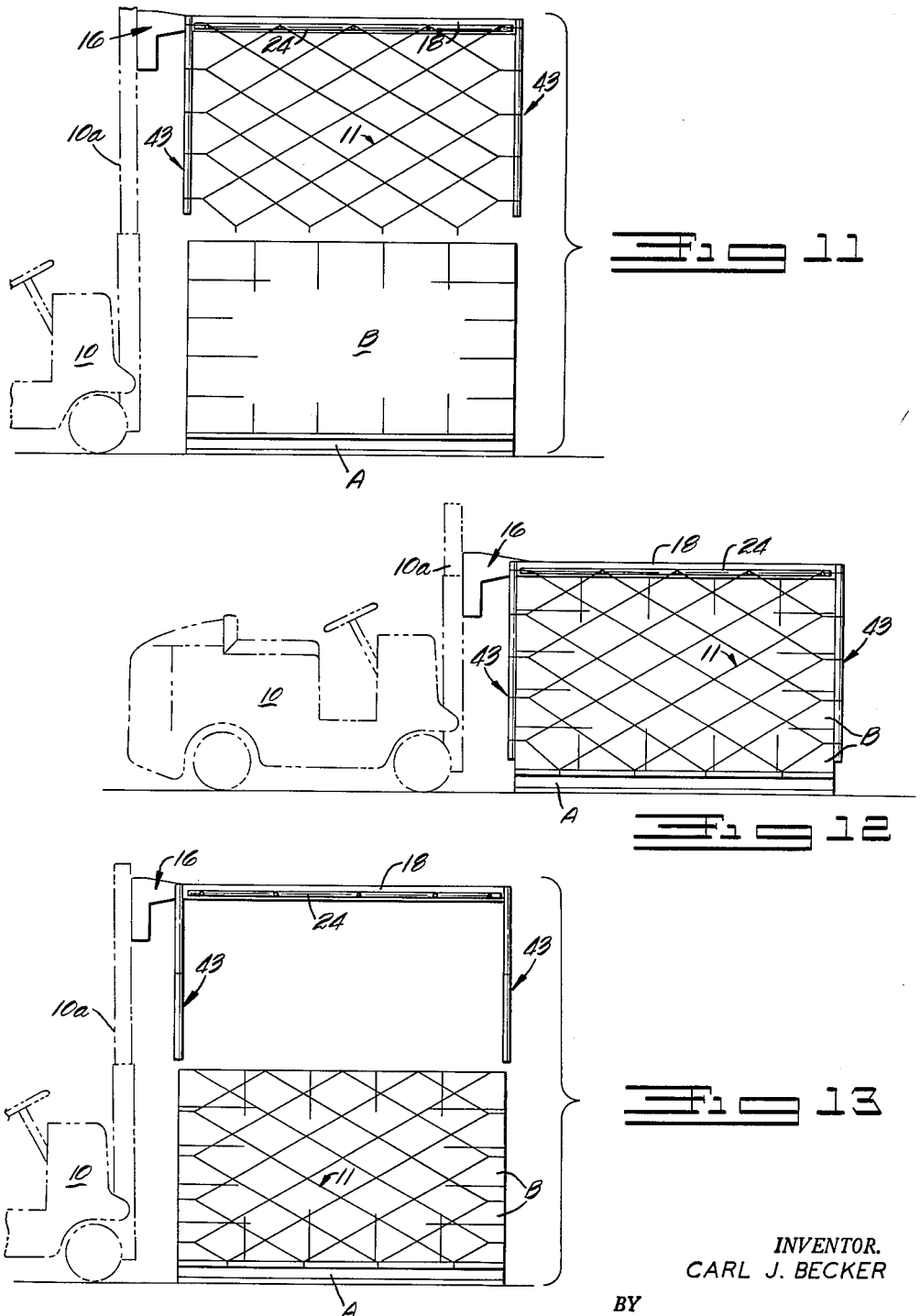

United States Patent Office 3,204,798
Patented Sept. 7, 1965

3,204,798
SUPPORTING FRAME FOR CARGO
TIE-DOWN NETS
Carl J. Becker, Cincinnati, Ohio, assignor to The Alvey-Ferguson Company, Cincinnati, Ohio, a corporation of Ohio
Filed July 19, 1962, Ser. No. 211,030
6 Claims. (Cl. 214—620)

This invention relates generally to an apparatus for placing a cargo net over a group of articles stacked on a pallet. It relates, more specifically, to a portable rack for releasably supporting a cargo tie-down net and positioning the same over a loaded pallet.

It has become a common practice in the transportation industry to palletize articles, such as boxes or crates, in order to effect economy in their handling. This is particularly true where the cargo consists of numerous boxes and crates that are more conveniently handled by mechanized equipment, such as mobile fork lifts. In many instances, particularly in aircraft transportation, it is necessary to secure the articles to the pallet to prevent inadvertent shifting or spillage of the cargo during transit. This is accomplished at the present time by manually placing a cargo net over the stacked articles and securing the net to the pallet. The cargo nets commonly utilized comprise a plurality of flexible web or tape members interconnected to form a lattice-type network. Although a cargo net of this type is satisfactory for this purpose, considerable difficulty has been encountered in placing the net over the stacked and palletized articles. Under ordinary circumstances, it is necessary for the net to be thrown over the palletized articles and so arranged to suspend and connect the loose or free ends of the net to the respective sides of the pallet. The obvious difficulties of thus positioning a cargo net are further increased when the palletized cargo stack approaches relatively large dimensions, of the order of eight feet square by ten feet in height. A loaded pallet of such dimensions usually requires that one or more workmen climb up on top of the stacked cargo to effect the proper arrangement of the net. The task is thus rendered more difficult as the workman must stand on portions of the net while arranging other portions. Manual handling of the cargo nets in this manner results in the expenditure of considerable time and labor as well as creating hazardous working conditions.

It is, therefore, the primary object of this invention to provide a portable rack or frame for transporting and suspending a cargo net over a loaded pallet for automatically releasing the net when the same occupies a desired position in tie-down relation to the stacked cargo.

It is also an object of this invention to provide a portable cargo net-handling rack or frame that may be readily attached to and transported by the usual fork lift truck to facilitate the transportation, elevation and placement of a cargo net over a loaded pallet within a cargo aircraft or other transport vehicle.

It is a further object of this invention to provide a portable cargo net handling rack having a net-engaging mechanism provided with an automatic release device for conveniently positioning a cargo net on a loaded pallet without requiring the physical presence of workmen upon the stacked cargo.

Still another object of the invention is to provide a cargo tie-down net-supporting frame which takes the form of an attachment for a mobile fork lift truck, and which may be quickly and easily detachably connected with the lifting forks or elevator bracket assembly of the standard types of lift trucks without modification thereto, and which, when so connected, may be easily transported, elevated or depressed in relation to a palletized cargo stack, so as to quickly and effectively drape and deposit a cargo tie-down net over the cargo stack.

These and other objects and advantages of this invention will be readily apparent from the following detailed description and the accompanying drawings.

In the drawings:

FIG. 2 is a top plan view of the rack;

FIG. 3 is a side elevational view thereof;

FIG. 4 is a fragmentary, end elevational view looking toward the mounting bracket of the net-supporting frame with the elevator bracket assembly of a lift truck shown in broken lines;

FIG. 5 is a detail vertical sectional view taken along lines 5—5 of FIG. 4;

FIG. 6 is an enlarged detail vertical sectional view of a shaft stop assembly taken along line 6—6 of FIG. 3;

FIG. 7 is an enlarged horizontal sectional view taken along line 7—7 of FIG. 3 and illustrating one of the net-supporting and releasing shaft assemblies of the supporting frame;

FIG. 8 is a vertical sectional view taken along line 8—8 of FIG. 7;

FIG. 9 is an enlarged fragmentary elevational view, partially in vertical section, showing one of the telescoping leg assemblies;

FIGS. 11, 12 and 13 are sequential diagrammatic views illustrating the operations of the rack in positioning a cargo net on a loaded pallet.

Figure 1:
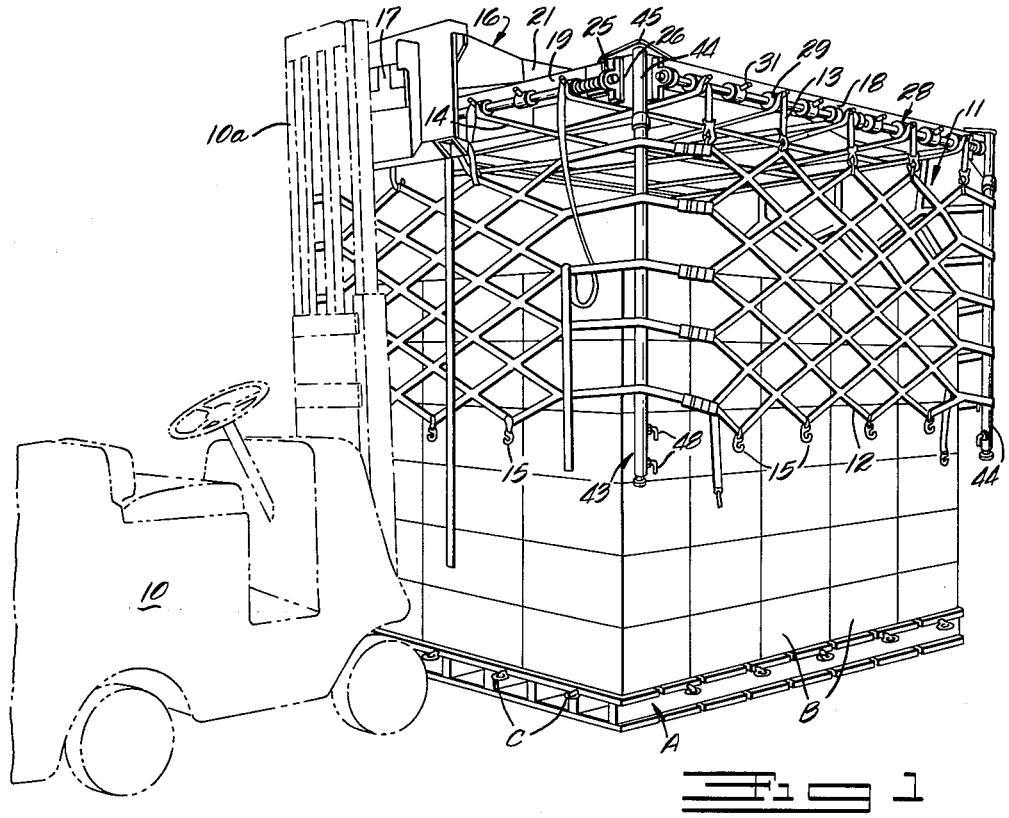
FIG. 1 is a perspective view showing the present net-supporting rack or frame carried by a fork lift truck and having a cargo tie-down net suspended therefrom above a palletized stack of cargo.

Referring to the drawings, the present cargo net-handling rack is shown in FIG. 1 mounted on a transporting and lifting vehicle, such as, for example, a fork lift truck 10. Supported by the rack is an open bottom cargo net 11 of the type commonly utilized in securing cargo to a pallet. In FIG. 1, the pallet, denoted generally by the letter A, is shown loaded with a stack of cubical containers or cartons B. The cargo net 11 comprises in general a plurality of interwoven flexible tapes or webs 12 forming a lattice network. The interwoven webs 12 extend around the loaded pallet and are interconnected across the top by a plurality of transversely and longitudinally extending webs 13 and 14. Preferably, the webs are adjustably connected by buckles to permit the net to be drawn tightly against the cargo containers B. The bottom webs of the net are provided with a plurality of hooks 15 to engage associated eye bolts C secured to the pallet A.

The rack (FIGS. 2 and 3) comprises a generally open frame of rectangular form from which the cargo net 11 is suspended. The frame is preferably fabricated from tubular members to obtain a suitably rigid structure with a minimal weight. It includes two parallel spaced side members 18 interconnected at each end by transversely extending members 19. Extending transversely between the side members 18 are a pair of tubular braces 20. The braces 20 are spaced intermediate the end members 19 and are secured to the side members 18 by angle brackets 20a further strengthening the frame. Extending longitudinally of the frame are a pair of spaced parallel beams 21. Each beam 21 is fabricated from a pair of tubular members which are secured to the upper surfaces of the end members 19 and braces 20 by L-form brackets 22. The beams 21 extend a distance outwardly from one end of the frame and have a mounting bracket 16 secured to the extreme ends thereof. The bracket 16 is formed to cooperatively engage an elevator frame 17 carried by a lifting mechanism 10a on the fork lift truck. Thus, a cargo net 11 suspended from the frame as illustrated in FIG. 1 may be conveniently elevated, transported and draped over the pallet A and the container B placed thereon.

Figure 10:
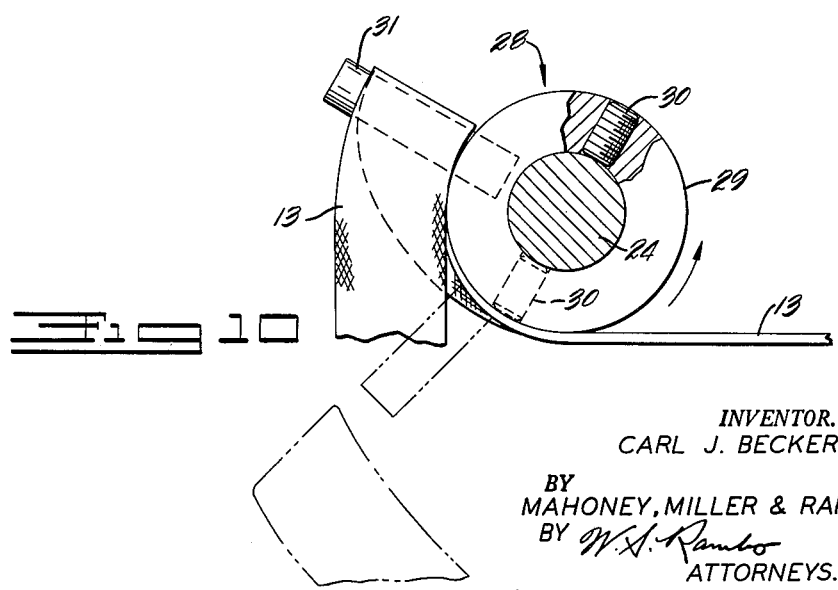
FIG. 10 is a detailed vertical sectional view of one of the net-supporting fingers of the rack taken along line 10—10 of FIG. 7.

Attached to each side and end member 18 and 19 of the frame is a net-supporting mechanism for releasably suspending the cargo net therefrom. The net-supporting mechanisms are similarly constructed and the following description of one such mechanism is applicable to the others. Each of the net-supporting mechanisms includes a shaft 24 rotatably mounted in a plurality of bearings 25 secured to the outer sides of the associated frame member. Each bearing 25 is secured to the frame member by a bracket 26 and associated bolts 27 to position the shaft 24 a distance outwardly from the frame member and below the lower surface thereof. Mounted on each shaft 24 are a plurality of axially spaced, net-supporting members 28 for releasably engaging the horizontally disposed webs 13 and 14. As is best shown in FIG. 10, each of the net-supporting members 28 comprises a collar 29 mounted on the shaft 24 and provided with a radially extending cylindrical finger 31. Each collar 29 is fixed to its respective shaft 24 by a pair of set screws 30. All of the net-supporting members 28 mounted on a particular shaft are so disposed as to align their respective fingers 31. In supporting a cargo net 11, the horizontally disposed upper webs 13 and 14 thereof extend beneath the frame and are looped over the respective fingers 31 which are normally disposed at an upwardly inclined angle. The outer ends of each of the webs 13 and 14 extend downwardly to support the interwoven side webs 12 of the cargo net 11 to which they are connected.

To maintain the fingers 31 in the normal upwardly inclined position, each of the shafts 24 is provided with a torsion spring biasing mechanism. This torsion mechanism (FIGS. 7 and 8) includes a helically wound coil spring 32 mounted on the shaft 24. One end of the spring 32 is anchored in an opening 33 formed in a downwardly extending leg of a restraining bracket 34. The bracket 34 is of T-form and is secured to the adjacent frame member by a bolt 35. The opposite end of the spring 32 is secured to a nut 36 threaded onto one end of the shaft 24 which is provided with screw threads 24a. When the nut 36 is fixed to the shaft 24, the spring 32 provides a biasing force which resists any rotational force applied to the shaft by the weight of a cargo net supported on the fingers 31. Rotation of the nut 36 relative to the shaft 24 will increase or decrease the biasing force of the spring 32 in accordance with its direction of rotation. The nut 36 is adjusted to provide a biasing force capable of maintaining the fingers 31 in an upwardly inclined position against an opposed rotative force produced by the weight of a cargo net. The nut 36 may be adjustably fixed to the shaft 24 by a lock nut 37 also threaded onto the shaft 24 to engage the nut 36. After locking the nut 36 to the shaft 24, the shaft may be rotated against the restraining force of the spring 32 but upon its release, the shaft will be returned to its normal position by the spring 32.

To prevent the springs 32 from rotating the shafts 24 beyond their desired position, each of the shafts 24 is also provided with a stop 38. Each stop 38 (see FIG. 6) includes a collar 39 fixed to the shaft 24 by a pair of setscrews 40. Attached to the periphery of each collar 39 is an angular bracket 41. Secured to the tubular side member 18 and end member 19, as by welding, adjacent each collar 39 of the frame is a plate 42. Each plate 42 extends a distance below the respective frame member to provide a surface for engaging one leg of the bracket 41 and preventing further rotation of the shaft 24. The stop, therefore, is positioned on the shaft 24 to locate the web-engaging member 28 properly when the bracket 41 is in contactaing engagement with the plate 42.

Attached to each corner of the frame is a vertically disposed guide or standard 43 to facilitate the positioning of a cargo net over a loaded pallet and to support the rack frame at an elevation relative to a ground surface when detached from a fork lift. Each guide 43 includes a tubular member 44 secured at its upper end to a corner gusset plate 45. The gusset plate 45 is attached to the side and end members 18 and 19 of the frame and extends a distance diagonally outwardly from the corners of the frame to define a rectangle having an area slightly greater than the pallet with which the rack will be utilized. Slidably disposed in the tubular member 44 is a smaller diameter tubular member 46 which may be extended downwardly. The lower end of the slidable member 46 is provided with a plate 47 forming a contacting surface. The telescoping tubes 44 and 46 may be adjusted as to their combined length to provide an adequate support for the interwoven webs 12 of the cargo net which are arranged around the guides. In placing a cargo net 11 over a loaded pallet, the guides 43 will thereby maintain the flexible cargo net 11 in a substantially rectangular form while it is being positioned over the pallet. Each guide 43 is provided with a locking means for securing the movable member 46 in its proper position. To avoid interfering with the movement of the cargo net, the locking means is preferably disposed on the portion of the guide facing inwardly toward the frame. The locking means comprises a pair of handles 48 which are threaded into nuts 49 welded to the outer periphery of the tubular member 44. The threaded end of each handle 48 extends inwardly thereof through an opening formed in the walls of the tubular members 44. Turning the handles 48 will bring the inner ends thereof into contacting engagement with the tubular members 46, thus locking the telescoping guide 43 at the desired length.

When the rack is detached from a fork lift, the guides or standards 43 may be utilized to support the frame at an elevation relative to a ground surface. Before detaching the rack from a fork lift, assuming that the rack is in an elevated position, the guides 43 are extended to the desired length and locked in position. As the rack with the guides 43 thus extended is lowered by the fork lift, the plates 47 attached to the slidable member 46 of the guides will contact a ground surface and the frame will be supported on the guides 43. The fork life may then be disengaged from the rack and utilized elsewhere while the workmen suspend a cargo net from the rack. Adjustability of the guides permits the frame to be supported at a convenient elevation for the workmen.

The mounting bracket 16, illustrated in detail by FIGS. 4 and 5, is particularly adapted for attaching the rack to the elevator frame 17 of a fork lift truck which has the usual forks removed therefrom. The frame 17, in the conventional manner, is attached at an intermediate portion to the lifting carriage of the lift truck and thus opposite ends of the frame 17 are free to enter vertically into the horizontally spaced pockets 59a of the bracket 16. The bracket comprises a rigid main frame of rectangular form including a pair of vertically disposed tubular end members 50 and upper and lower horizontally disposed, vertically spaced tubular members 51. Each of the end members 50 is secured to the outer end of an associated beam 21 by a bracket 52 of L-form. The upper and lower members 51 extend transversely between and are secured to the end members 50. Disposed intermediately of the end members 50 is a vertically disposed, center member 53 which extends between and is secured at its ends to the upper and lower members 51. Extending horizontally between the center member 53 and each end member 50 is a horizontally disposed angle member 54. Each angle member 54 is also spaced vertically below the upper tubular member 51 to provide an opening 54a through the bracket 16. Secured to the outer face of the lower tubular member 51 is a horizontally extending plate 55 which extends outwardly beyond the end members 50 on each side of the bracket 16. Secured to the plate 55 at each end thereof are relatively short, angle sections 56. Each of the angle sections 56 is disposed with one flange extending horizontally outward from the plate 55. Secured to the upper tubular member 51 are a pair of angle members 57 forming a horizontally disposed T-rail with the leg thereof extending outwardly from the tubular member 51. Gusset members 58 are welded to the angle members 56 and 57 to increase the strength thereof. A rectangular pocket-forming plate 59 is secured to each end of the bracket 16 by welding to the outwardly extending flanges of the angle members 56 and 57 respectively. The plates 59 are thus spaced outwardly from the main rectangular frame of the bracket 16 at the opposite ends thereof to form a pair of downwardly and inwardly opening pockets 59a to receive the opposite end portions of the elevator frame members 17 of the fork lift truck.

The bracket 16 of the rack may thus be detachably engaged with the elevator frame members 17 by merely moving the elevator frame 17 upwardly so as to insert the outer end portion thereof into the pockets 59a formed by by the plates 59. In this regard, it will be understood that the usual type of elevator frame 17 with which a fork lift truck 10 is provided consists of a pair of horizontally disposed, vertically spaced members which project slightly outwardly from and are attached to the lifting mechanism 10a of the lift truck by struts (not shown) attached to the central portions of the elevator frame members 17. The extreme ends of the elevator frame members are thus free to enter the end pockets 59a of the bracket 16 from below. As indicated in FIGS. 4 and 5, the horizontal member of the elevator frame 17, shown by the broken lines, will be positioned to engage the plate 59 and the plate 55. The weight of the rack normally holds the same on the elevator frame 17.

Alternatively, if desired, the present rack may be engaged and transported upon the usual outwardly projecting, laterally spaced forks 17a which are detachably carried by the elevator frame 17 of the lift truck. In such instance, as indicated by broken lines in FIG. 2, the forks 17a fit between the pair of parallel beams 21 and are inserted through the openings 54a formed in the bracket 16 by the angle members 54, the upper tubular member 51 and the intermediate vertical center member 53. The forks 17a are of a sufficient length to extend inwardly of the frame to engage beneath an angle member 60 (see FIG. 2) which is connected between the beams 21 a distance inwardly from the end member 19. In lifting the rack by means of the forks 17a, the angles 54 of the bracket bear upwardly on the lower surfaces of the forks 17a to prevent pivoting of the rack.

To utilize the rack, it is first necessary to suspend a cargo net 11 from the frame. This may be readily accomplished when the rack is either mounted on an associated fork lift truck or is supported by the guides 43 when positioned on the ground. As best shown in FIG. 1, the interwoven webs 12 are arranged around the guides 43 and the horizontal webs 13 and 14 are positioned beneath the frame. Each of the webs 13 and 14 are looped over the fingers 31 of their respective web-engaging members as shown in FIG. 10 to suspend the net from the frame. The rack is then lifted by the fork lift truck to a sufficient height to clear the loaded pallet. If necessary, to accommodate the particular net being utilized, the guides 43 may be extended to maintain the net in its rectangular form. As shown best by the sequential FIGS. 11, 12 and 13, the rack is transported by the fork lift to be positioned vertically above the pallet. The rack and suspended net is then lowered over the containers B as shown in FIG. 12, and the hooks 15 on the bottom of the net may then be connected to an associated eye bolt C secured to the pallet A.

To release the net from the rack, it is only necessary that the rack be lifted vertically by the fork lift truck. As the rack is lifted, the cargo net 11, which has been secured to the pallet A, will cause the webs 13 and 14 to pull downwardly on their respective supporting fingers 41. Further lifting of the rack will thereby cause the shafts 24 to rotate revolving the fingers 31 to downwardly inclined position as shown by the broken lines in FIG. 10. With the fingers 31 disposed in a downwardly inclined position, the webs 13 and 14 will slide off the fingers 31 and release the web-engaging members 28. At this time, the spring 32 will rotate the shaft 24 and return the web-engaging members to their normal position. Continuing lifting of the rack will pull the guides 43 upwardly and remove them from the cargo net 11, as shown in FIG. 13. The fork lift truck may then transport the rack to a desired location where another cargo net may be suspended therefrom.

The height to which a rack must be elevated when positioning a net over a loaded pallet is usually determined by the height of a stack of cargo and the corresponding distance which the bottom interwoven webs 12 depend from the frame. If the stacked cargo attains a height of about ten feet, the rack would normally be elevated to about twenty feet to provide clearance of the bottom webs of the net over the top of the stacked cargo. Where it is impossible to elevate the rack for normal operation due to limitations of the fork lift or the presence of physical obstruction, the depending webs 12 may be temporarily folded upwardly with the bottom webs also connected to the web-engaging fingers 31, or any other convenient member located adjacent the frame, by the hooks 15. Thus, the height to which the rack must be elevated will be reduced to about three-fourths of that previously required. After lowering the rack with the folded net over the loaded pallet, the hooks 15 are disconnected from the fingers 31 and secured to the eye bolts C as previously described.

It will thus be readily apparent that the cargo net handling rack of this invention greatly facilitates the placement of cargo nets over loaded pallets. The cargo net may be initially positioned on the rack when the latter is supported at a convenient elevation for the workmen. This operation may be quickly accomplished as it is only necessary to loop the horizontal webs over the fingers of the web-engaging members. The use of the present rack substantially reduces the manual labor required in placing a cargo net over a pallet and the time heretofore required. After securing the net to the pallet, the rack may be removed therefrom simply by elevating the rack. The web-engaging members automatically release the net without any further manual operation.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A cargo net handling rack for positioning an open bottom net formed with interwoven webs over stacked cargo comprising a generally rectangular frame having a peripheral edge portion, bracket means connected to said frame and engageable with a vertically movable member of a mobile lift truck for detachably supporting said frame in a substantially horizontal plane and in outwardly extended relation to such vertically movable member; and a plurality of net-engaging members carried by said frame at the peripheral edge portion thereof for releasably supporting a net in depending relationship to said frame, said net-engaging members comprising a plurality of relatively spaced fingers movable between upwardly inclined positions and downwardly inclined positions, and spring means connected with said members for biasing said fingers toward their upwardly inclined positions.

2. A cargo net handling rack according to claim 1, wherein each of said net-engaging members comprises a horizontally disposed, elongated shaft rotatably mounted on the peripheral edge portion of said frame and having a plurality of said fingers extending radially outwardly from said shaft.

3. A cargo net handling rack according to claim 2, wherein said spring means comprises a helical torsion spring having a first end secured to said shaft and a second end secured to said frame, said first end being adjustably secured to said shaft to vary the tension thereof.

4. A cargo net handling rack for positioning an open bottom net over stacked cargo comprising a frame having a peripheral edge portion; means connected to said frame for detachably engaging a vertically movable member of an elevating mechanism and for supporting said frame in a substantially horizontal plane; a plurality of spring-biased net-engaging members carried on the peripheral edge portion of said frame for releasably supporting a net with the side portions thereof in depending relation to said frame; and depending guide means carried by said frame for maintaining the depending side portions of a net in substantially vertical planes.

5. A cargo net handling rack according to claim 4, wherein said guide means includes a plurality of elongated, downwardly extending standards, each of said standards being offset a distance outwardly from the peripheral edge portion of said frame and said standards being arranged to support said frame in elevated relation to a supporting surface when said frame is detached from an associated elevating mechanism.

6. A cargo net handling rack according to claim 5, in which each of said standards includes an upper member connected to said frame and a lower member, said lower member being movably mounted relative to said upper member for extension in a downward direction, and means for locking said lower member to said upper member.

References Cited by the Examiner

UNITED STATES PATENTS

| | | | |
|---|---|---|---|
| 441,255 | 11/90 | Prichard | 294—83 |
| 916,762 | 3/09 | McFadden | 212—8 X |
| 2,617,664 | 11/52 | Carlton. | |
| 2,696,317 | 12/54 | Toffolon | 214—620 |
| 2,968,477 | 1/61 | Wilkinson. | |
| 3,083,992 | 4/63 | Post | 114—235 |
| 3,110,331 | 11/63 | Buchanan | 294—83 X |

FOREIGN PATENTS 839,629   6/60   Great Britain.

HUGO O. SCHULZ, *Primary Examiner.*

ERNEST A. FALLER, JR., MORRIS TEMIN

*Examiners.*